F. TYSON.
ELASTIC SHAFT CONNECTION.
APPLICATION FILED NOV. 15, 1909.

976,232.

Patented Nov. 22, 1910.

Witnesses
J. H. Bishop.
Irene Lutz.

Inventor
Frank Tyson.

By
Bond & Miller
Attorneys

UNITED STATES PATENT OFFICE.

FRANK TYSON, OF CANTON, OHIO.

ELASTIC SHAFT CONNECTION.

976,232.  Specification of Letters Patent.  Patented Nov. 22, 1910.

Application filed November 15, 1909. Serial No. 528,062.

*To all whom it may concern:*

Be it known that I, FRANK TYSON, a citizen of the United States, residing at Canton, in the county of Stark and State of Ohio, have invented a new and useful Elastic Shaft Connection, of which the following is a specification.

My invention relates to improvements in elastic shaft connections adapted to be arranged intermediate a driving element and a driven element for the purpose of mitigating the strain upon one or other of said elements by reason of the unbalanced condition between the power applied by the driving element and the resistance produced by the work accomplished by the driven element.

The objects of my improvement are to generally improve devices of the character mentioned, and to provide a device of simple and inexpensive construction which will have but few parts while at the same time being strong and thoroughly efficient in compensating for variations both as to stress and rate of motion as between a driven element and a driving element, to provide a device wherein any undue strain exerted thereon will not produce permanent injury thereto and to accomplish other objects readily apparent to those skilled in the art. The construction by which I attain these objects is illustrated in the accompanying drawing, in which—

Figure 1:
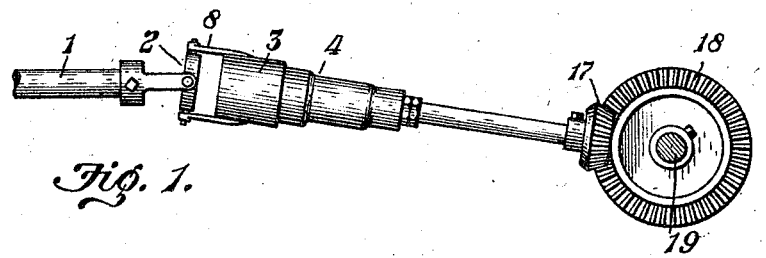
Figure 2:
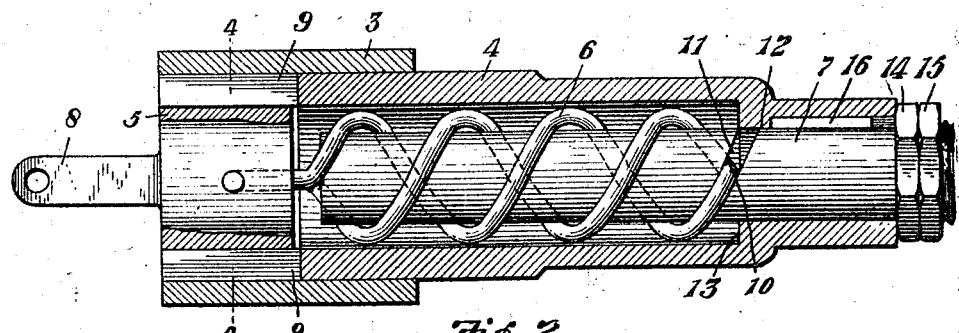
Figure 3:
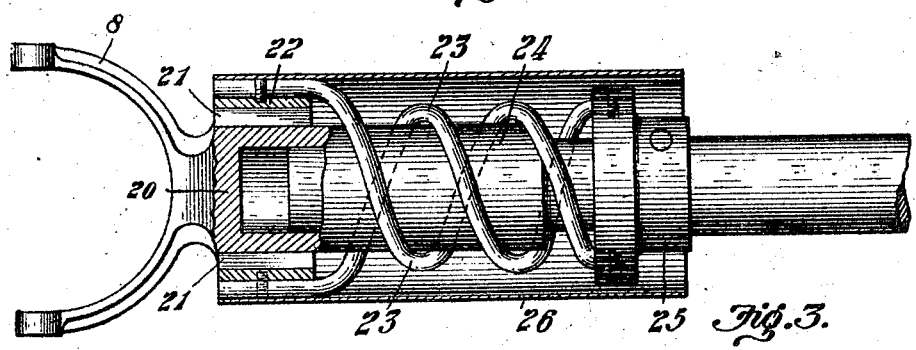
Figure 4:
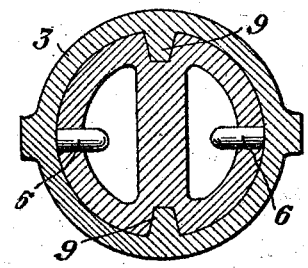

Figure 1 is a side elevation of a shaft connection embodying my invention as applied to the jack-shaft of an automobile. Fig. 2 is a view, partly in longitudinal section, illustrating the internal construction of the device. Fig. 3 is a view, partly in longitudinal section, of a modified form of the device. Fig. 4 is a transverse sectional view taken on the line 4—4 of Fig. 2.

Throughout the several views similar numerals of reference indicate similar parts.

The numeral 1 indicates the shaft connected either directly or intermediately with some source of power, as a gasolene engine. The numeral 2 indicates generally a universal joint or connection between the shaft 1 and the elastic shaft connection. The said elastic shaft connection comprises a driving member 3, a relatively rotatable spring casing 4, a slidable head 5, a helical connecting spring 6 and a driven member 7. Operative connection between the driving member 3 and the universal joint 2 is made by any suitable, well known mechanical means, as by the spaced integral arms 8. The driving element thus transmits rotary motion to the said driving member 3, as will be readily understood.

The slidable head 5 is prevented from relative rotation with the driving member by means of the splines 9, which are preferably formed integrally with the driving member 3 and are longitudinally slidable within corresponding grooves in the head 5. The driving member 3 is preferably formed of sufficient length to extend beyond the head 5 and form a bearing for the spring casing 4, which is rotatable with reference to the said driving member. The driven member 7 may be the forward end of the jack-shaft, as illustrated in the drawing or may be connected to some other device which it is intended to operate. In the construction illustrated the forward end of the jack-shaft extends nearly to the head 5, there being a slight space between them as illustrated in Fig. 2.

The driving member 3 and the driven member 7 are independent of each other in so far as rotation is concerned except for the elastic or resilient connection accomplished by the spring 6. The said spring is preferably formed of a single piece, the ends of which are bent at right angles to the general axis of the device and are arranged in apertures in the sides of the slidable head 5, as illustrated in Figs. 2 and 4. Extending into the spring casing 4 the said spring is wound in a double helical formation about the driven member 7, the two parts thereof winding about the said member in the same direction and being united by an integral cross-piece or yoke at 10 having its axis at right angles to the general axis of the device. The attachment of the spring 6 to the driven member 7 is preferably made at the said yoke portion, and one suitable method of fastening is that illustrated in Fig. 2. There it will be noted that a diagonal slot 11 is cut into the driven member 7, into which the yoke connecting the two portions of the spring is forced. The spring casing 4 is provided with the reduced portion 12 which is adapted to closely fit the driven member 7, and some means of clamping the shoulder 13 of the said reduced portion against the spring to keep it in place within said slot 11 should be provided. Such means may consist of an adjusting nut 14 and jamb nut 15 as illustrated in Figs. 1 and 2, the spline 16 serving to key the spring casing 4 against relative rotation with the member 7. It will now be understood that the casing 4 and the connected ends of the spring 6 will be adapted to rotate with the driven member 7, whereas the driving member 3 will carry with it in its rotation the slidable head 5 and the separated ends of the said spring 6.

It is immaterial, to an extent, in which direction the spring 6 is wound, but it is the preferable construction to so arrange said spring that in the usual and normal rotation of the driving member 3 the tendency will be to increase the number of helical turns or windings of said spring, thus tending to contract said spring both transversely and longitudinally. The transverse or diametrical contraction is limited by reason of the fact that when said spring has sufficiently contracted it will engage the member 7 about which it is wound, and the longitudinal contraction of said spring will produce a sliding movement of the head 5 with reference to the member 3, the said head 5 readily assuming the proper longitudinal adjustment with reference to the driving member 3 while remaining in fixed rotative relation with said member.

It should be noted that the spring 6 may be connected to the head 5 and to the driven element 7 in any appropriate mechanical manner, the method shown and described being only one suggested form of connection. It should be also noted that it may be desirable to form the spring in two separate parts instead of from a single piece, suitable connections for the separate ends of said springs being made with the member 7 instead of the connection illustrated in Fig. 2.

The beveled gears 17 and 18, the latter being arranged upon the shaft 19 are illustrated merely for the purpose of showing a practical application of my invention in the case of an automobile or similar device, the said gears forming no part of the present invention.

An elastic shaft connection of the character described having been provided the operation of the same is as follows. Upon the power being first applied and producing rotation of the driving member 3, the rotation of said member will be communicated through the splines 9 to the head 5. The head 5, in rotating will at first wind the inert spring 6, thus placing the same under torsional strain and imparting what may be termed an initial resilient torque to the driven member 7. The driven member 7 is thus permitted to begin its rotation at a slightly later instant of time than the first movement of rotation of the driving member 3, and at an appreciably slower rate of speed, the elasticity of the spring 6 permitting some relative movement as between the member 3 and the member 7 in starting. It will be evident, however, that after the member 7 has been fairly started any unnecessary torsional strain remaining in the spring 6 will be relieved by a further relative movement as between the member 3 and member 7, the said spring normally bearing only so much strain as is necessary to transmit the required power to the driven element. If at any time during the operation of the device there is any sudden over-balance of power or resistance, the said spring will in a large measure prevent harmful results, by elastically distributing said over-balance as between the unbalanced parts. The application of the herein described invention to gasolene motor driven automobiles will therefore be highly advantageous, as any pulsation or irregularity in the rotation of the driving element will be in a large measure overcome in the transmission of the power through the herein described device to the driven element. In a similar manner sudden resistances will be over-come without shock to the driving element.

In Fig. 3 is illustrated a modified form of the device wherein the spring casing 4 is not employed and wherein two separate springs are used. The driving member 20 in said figure is provided externally with the splines 21 which form longitudinally slidable connection with a collar 22 to which one end of each spring 23 is connected in any suitable manner. The driving member is provided with a longitudinally extending barrel portion 24 around which the springs 23 are helically disposed, the remaining ends of said springs being attached in any suitable manner to a head 25 keyed against rotation on the driven member 7. The said driven member extends through said head and is journaled within the barrel portion 24. The spring casing 26 in said modified form consists preferably of a sheet metal device of tubular form attached externally to the collar 22 and extending rearwardly in spaced relation with other parts of the device, but forming a sufficient protection to the parts inclosed.

I claim:

1. An elastic shaft connection comprising a driving member, a driven member, a head rotatable with one of said members and longitudinally slidable therealong and a helical spring operatively connecting said driving and driven members, one end of said spring being connected to said head on one member and the other end of said spring being connected to the other member.

2. An elastic shaft connection comprising a driving member, a driven member and a helical spring, said spring being connected to one of said members, and spring connecting means arranged upon said other member and adapted to fasten said other member and said spring to each other for rotation together, while permitting relative longitudinal movement as between said spring connecting means and said other member.

3. A device of the character described comprising a driving member, a head rotatable with said driving member but longitudinally slidable with reference thereto, a driven member, a helical spring operatively connecting said head with said driven member and a spring casing connected to one of said members and arranged about said spring.

4. A device of the character described comprising a driving member, a head rotatable with said driving member but longitudinally slidable with reference thereto, a driven member, a spring casing mounted on said driven member and rotatable therewith and a helical spring located within said spring casing and operatively connecting said head with said driven member.

5. A device of the character described comprising a driving member, a head rotatable therewith but longitudinally slidable with reference thereto, a driven member, a spring casing fixedly mounted on said driven member, said casing and said driving member rotatably connected together and a spring located within said spring casing and operatively connecting said head and said driven member.

6. An elastic connection adapted to be arranged intermediate a driving element and a driven element and comprising a driving member, a head rotatable therewith but longitudinally slidable with reference thereto, a driven member, a spring attached at one end to said driven member, helically disposed about said driven member and attached at its other end to said slidable head.

7. A device of the character described comprising a driving member, a head rotatable therewith but longitudinally slidable with reference thereto, a driven member, a spring casing fixedly mounted on said driven member, said spring casing and said driving member provided with mutually engaging bearing surfaces, said driven member extending within said spring casing; and a double helical spring attached to said driven member and wound about the same within said casing and attached to said slidable head, said spring constituting the sole power-conducting medium between said driving member and said driven member.

8. An elastic power connection comprising a driving member, a driven member and resilient connecting means intermediate said members, said means adapted to transmit power from said driving member to said driven member, said resilient connecting means fixedly connected to one of said members and non-rotatably but longitudinally slidably connected to said other member, whereby the shock of transmission is absorbed without changing the relative longitudinal relation of said driving and driven members.

In testimony that I claim the above, I have hereunto subscribed my name in the presence of two witnesses.

FRANK TYSON.

Witnesses:
 IRENE LUTZ,
 WILLIAM H. MILLER.